(12) United States Patent
Segal et al.

(10) Patent No.: US 11,867,823 B2
(45) Date of Patent: *Jan. 9, 2024

(54) SYSTEM AND METHOD FOR DETERMINING GNSS POSITIONING CORRECTIONS

(71) Applicant: Swift Navigation, Inc., San Francisco, CA (US)

(72) Inventors: Benjamin Lipeles Segal, San Francisco, CA (US); Mark Fine, San Francisco, CA (US); Joseph Angelo, San Francisco, CA (US); Leith Bade, San Francisco, CA (US); Fergus MacPherson Noble, San Francisco, CA (US)

(73) Assignee: Swift Navigation, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/833,560

(22) Filed: Jun. 6, 2022

(65) Prior Publication Data

US 2022/0308238 A1     Sep. 29, 2022

Related U.S. Application Data

(63) Continuation of application No. 17/374,523, filed on Jul. 13, 2021, now Pat. No. 11,378,699.
(Continued)

(51) Int. Cl.
G01S 19/40 (2010.01)
G01S 19/04 (2010.01)
(Continued)

(52) U.S. Cl.
CPC .............. G01S 19/40 (2013.01); G01S 19/04 (2013.01); G01S 19/072 (2019.08); G01S 19/43 (2013.01)

(58) Field of Classification Search
CPC ........ G01S 19/43; G01S 19/04; G01S 19/072; G01S 19/40
See application file for complete search history.

(56) References Cited

U.S. PATENT DOCUMENTS

| 5,610,614 A | 3/1997 | Talbot et al. |
|---|---|---|
| 6,427,122 B1 | 7/2002 | Lin |

(Continued)

FOREIGN PATENT DOCUMENTS

| CA | 2718988 C | 1/2014 |
|---|---|---|
| CN | 103197327 A | 7/2013 |

(Continued)

OTHER PUBLICATIONS

"RAIM", GMV, 2011, RAIM.
(Continued)

*Primary Examiner* — Harry K Liu
(74) *Attorney, Agent, or Firm* — Jeffrey Schox; Randy Mehlenbacher

(57) ABSTRACT

A system or method for generating GNSS corrections can include receiving satellite observations associated with a set of satellites at a reference station, determining atmospheric corrections valid within a geographical area; wherein geographical areas associated with different atmospheric corrections can be overlapping, and wherein the atmospheric corrections can be provided to a GNSS receiver when the locality of the GNSS receiver is within a transmission region of the geographical area.

25 Claims, 6 Drawing Sheets

Related U.S. Application Data

(60) Provisional application No. 63/051,007, filed on Jul. 13, 2020.

(51) Int. Cl.
  *G01S 19/43* (2010.01)
  *G01S 19/07* (2010.01)

(56) References Cited

U.S. PATENT DOCUMENTS

| | | |
|---|---|---|
| 6,453,237 B1 | 9/2002 | Fuchs et al. |
| 6,552,680 B1 | 4/2003 | Barber et al. |
| 6,647,340 B1 | 11/2003 | Pemble et al. |
| 6,691,066 B1 | 2/2004 | Brodie |
| 6,753,810 B1 | 6/2004 | Yang et al. |
| 6,856,905 B2 | 2/2005 | Pasturel et al. |
| 6,864,836 B1 | 3/2005 | Hatch et al. |
| 7,026,982 B2 | 4/2006 | Toda et al. |
| 7,219,013 B1 | 5/2007 | Young et al. |
| 7,289,061 B2 | 10/2007 | Komjathy et al. |
| 7,292,183 B2 | 11/2007 | Bird et al. |
| 7,692,578 B2 | 4/2010 | Vollath et al. |
| 7,696,922 B2 | 4/2010 | Nicholson et al. |
| 8,094,065 B2 | 1/2012 | Henkel |
| 8,193,976 B2 | 6/2012 | Shen et al. |
| 8,416,133 B2 | 4/2013 | Hatch et al. |
| 8,447,517 B2 | 5/2013 | Roh |
| 8,542,146 B2 | 9/2013 | Vollath |
| 8,610,624 B2 | 12/2013 | Savoy |
| 8,756,001 B2 | 6/2014 | Georgy et al. |
| 8,760,343 B2 | 6/2014 | Milyutin et al. |
| 8,825,456 B2 | 9/2014 | Vasudevan et al. |
| 8,860,609 B2 | 10/2014 | Roh |
| 8,996,311 B1 | 3/2015 | Morin et al. |
| 9,069,073 B2 | 6/2015 | Ramakrishnan et al. |
| 9,128,176 B2 | 9/2015 | Seeger |
| 9,182,497 B2 | 11/2015 | Geier et al. |
| 9,405,012 B2 | 8/2016 | Doucet et al. |
| 9,405,016 B2 | 8/2016 | Yim |
| 9,557,422 B1 | 1/2017 | Miller et al. |
| 9,576,082 B2 | 2/2017 | Sparks et al. |
| 9,602,974 B2 | 3/2017 | Rudow et al. |
| 9,612,341 B2 | 4/2017 | Large et al. |
| 9,671,501 B2 | 6/2017 | Leandro et al. |
| 9,709,683 B2 | 7/2017 | Leandro et al. |
| 9,784,844 B2 | 10/2017 | Kana et al. |
| 10,101,464 B2 | 10/2018 | Appleford et al. |
| 10,191,157 B2 | 1/2019 | Dai et al. |
| 10,260,888 B2 | 4/2019 | Takahashi |
| 10,274,606 B1 | 4/2019 | Phan et al. |
| 10,473,790 B2 | 11/2019 | Noble et al. |
| 10,578,747 B2 | 3/2020 | Grgich et al. |
| 10,677,933 B1 | 6/2020 | Gavrilets et al. |
| 10,809,388 B1 | 10/2020 | Carcanague et al. |
| 11,131,774 B2 * | 9/2021 | Miya ............. G01S 19/20 |
| 11,156,718 B2 | 10/2021 | Takeda |
| 11,187,813 B2 | 11/2021 | Brandl et al. |
| 11,624,838 B2 | 4/2023 | Fine et al. |
| 2005/0001762 A1 | 1/2005 | Han et al. |
| 2005/0001763 A1 | 1/2005 | Han et al. |
| 2005/0024263 A1 | 2/2005 | Sharpe et al. |
| 2005/0114023 A1 | 5/2005 | Williamson et al. |
| 2008/0205521 A1 | 8/2008 | Van |
| 2009/0018772 A1 | 1/2009 | Watanabe et al. |
| 2009/0184869 A1 | 7/2009 | Talbot et al. |
| 2009/0224969 A1 | 9/2009 | Kolb |
| 2009/0262013 A1 | 10/2009 | Vollath |
| 2009/0273511 A1 | 11/2009 | Schroth |
| 2010/0033370 A1 | 2/2010 | Lopez et al. |
| 2010/0164789 A1 | 7/2010 | Basnayake |
| 2010/0283675 A1 | 11/2010 | McAree et al. |
| 2011/0090116 A1 | 4/2011 | Hatch et al. |
| 2011/0122022 A1 | 5/2011 | Van et al. |
| 2011/0140959 A1 | 6/2011 | Vollath |
| 2011/0148698 A1 | 6/2011 | Vollath |
| 2011/0187589 A1 | 8/2011 | Gaal et al. |
| 2011/0187590 A1 | 8/2011 | Leandro |
| 2011/0316740 A1 | 12/2011 | Waters et al. |
| 2012/0154210 A1 | 6/2012 | Landau et al. |
| 2012/0176271 A1 | 7/2012 | Dai et al. |
| 2013/0050020 A1 | 2/2013 | Peck et al. |
| 2013/0099970 A1 | 4/2013 | Lin et al. |
| 2013/0227377 A1 | 8/2013 | Rao et al. |
| 2013/0234885 A1 | 9/2013 | Geier et al. |
| 2013/0265191 A1 | 10/2013 | Ghinamo |
| 2013/0271318 A1 | 10/2013 | Landau et al. |
| 2014/0015712 A1 | 1/2014 | Leandro et al. |
| 2014/0062765 A1 | 3/2014 | Brenner |
| 2014/0184442 A1 | 7/2014 | Large et al. |
| 2014/0232592 A1 | 8/2014 | Psiaki et al. |
| 2014/0240172 A1 | 8/2014 | Milyutin et al. |
| 2015/0019464 A1 | 1/2015 | Nguyen-Tuong et al. |
| 2015/0260848 A1 | 9/2015 | Mundt et al. |
| 2015/0293230 A1 | 10/2015 | Weed et al. |
| 2015/0293233 A1 | 10/2015 | De Jong |
| 2016/0011318 A1 | 1/2016 | Cohen |
| 2016/0097859 A1 | 4/2016 | Hansen et al. |
| 2016/0195617 A1 | 7/2016 | Phatak et al. |
| 2017/0269222 A1 | 9/2017 | Dai et al. |
| 2017/0269231 A1 | 9/2017 | Dai et al. |
| 2017/0299730 A1 | 10/2017 | Lie et al. |
| 2017/0322313 A1 | 11/2017 | Revol et al. |
| 2018/0113219 A1 | 4/2018 | Wuebbena |
| 2018/0120445 A1 | 5/2018 | Dill |
| 2018/0172838 A1 | 6/2018 | Junker et al. |
| 2018/0252818 A1 | 9/2018 | Sato et al. |
| 2018/0283882 A1 | 10/2018 | He et al. |
| 2018/0299562 A1 | 10/2018 | Green |
| 2019/0004180 A1 | 1/2019 | Jokinen |
| 2019/0154837 A1 | 5/2019 | Noble et al. |
| 2019/0187295 A1 | 6/2019 | Lee et al. |
| 2019/0187298 A1 | 6/2019 | Grgich et al. |
| 2019/0204450 A1 | 7/2019 | Revol |
| 2019/0302274 A1 | 10/2019 | Berntorp et al. |
| 2019/0339396 A1 | 11/2019 | Turunen |
| 2019/0383948 A1 | 12/2019 | Hoeferlin et al. |
| 2020/0025936 A1 | 1/2020 | Zhou et al. |
| 2020/0025937 A1 | 1/2020 | Kroeger et al. |
| 2020/0041654 A1 | 2/2020 | Noble et al. |
| 2020/0096649 A1 | 3/2020 | Brandl et al. |
| 2020/0209406 A1 | 7/2020 | Lin et al. |
| 2020/0233056 A1 | 7/2020 | Dolgov et al. |
| 2020/0257002 A1 | 8/2020 | Henkel |
| 2021/0033735 A1 | 2/2021 | Kleeman |
| 2021/0372793 A1 | 12/2021 | Nikulin et al. |
| 2022/0058322 A1 | 2/2022 | Brandl et al. |
| 2022/0107427 A1 | 4/2022 | Kleeman et al. |
| 2023/0140535 A1 * | 5/2023 | Ma ............. H04W 56/0045 370/316 |

FOREIGN PATENT DOCUMENTS

| | | | |
|---|---|---|---|
| CN | 103760573 A | | 4/2014 |
| CN | 107085626 A | * | 8/2017 |
| CN | 105629263 B | | 4/2019 |
| CN | 107422354 B | | 6/2019 |
| CN | 114174850 A | | 3/2022 |
| DE | 102017212603 A1 | | 1/2019 |
| DE | 102018202223 A1 | * | 8/2019 ............. G01S 19/07 |
| EP | 0244091 A2 | | 11/1987 |
| EP | 2602752 A1 | | 6/2013 |
| EP | 1839070 B2 | | 4/2014 |
| EP | 2966477 A1 | | 1/2016 |
| EP | 3627188 A1 | | 3/2020 |
| EP | 3566021 B1 | | 3/2021 |
| EP | 3828595 A1 | * | 6/2021 ............. G01S 19/07 |
| EP | 3963352 A1 | | 3/2022 |
| KR | 101181990 B1 | | 9/2012 |
| WO | 02061449 A1 | | 8/2002 |
| WO | 2017046914 A1 | | 3/2017 |
| WO | 2017070732 A1 | | 5/2017 |

(56) References Cited

FOREIGN PATENT DOCUMENTS

| WO | 2018188845 A1 | 10/2018 |
|---|---|---|
| WO | 2020240307 A1 | 12/2020 |

OTHER PUBLICATIONS

"An Introduction to GNSS, Chapter 4, GNSS Error Sources", https://novatel.com/an-introduction-to-gnss/chapter-4-gnsserror-sources, published 2015.
"Geo++ SSR for Network-RTK, PPP and PPP-RTK", https://geopp.de/wp-content/uploads/2020/09/SSR_Flyer_v3.pdf, Sep. 2015.
"IGS State Space Representation (SSR) Format Version 1.00", International GNSS Service (IGS), Oct. 5, 2020.
"Integrity-Navipedia", https://gssc.esa.int/navipedia/index.php/Integrity, published 2011.
"Phase II of the GNSS Evolutionary Architecture Study", https://www.faa.gov/about/office_org/headquarters_offices/ato/service_units/techops/navservices/gnss/library/documents/media/geasphaseii_final.pdf, Feb. 2010.
"Safe Position Augmentation for Real-Time Navigation (SPARTN) Interface Control Document Version 1.8.0", Jan. 2020, Sapcorda Services GmbH.
Altmayer, Christian, "Cycle Slip Detection and Correction by Means of Integrated Systems", ION Institute of Navigation, Proceedings of the 200 National Technical Meeting of the Institute of Navigation, Abstract, Jan. 26-28, 2000.
Blanch, Juan, et al., "RAIM with Optimal Integrity and Continuity Allocations Under Multiple Failures", IEEE Transactions on Aerospace and Electronic Systems, vol. 46, No. 3, Jul. 2010.
Brack, A., "Optimal Estimation of a Subset of Integers With Application to GNSS", Artificial Satellites, vol. 51, No. 4—2016 DOI: 10.1515/arsa-2016-0011.
Brocard, Philippe, "Integrity monitoring for mobile users in urban environment", https://tel.archives-ouvertes.fr/tel-01379632/document, submitted Oct. 11, 2016.
Bruno, Jon, et al., "A realistic simulation framework to evaluate ionospheric tomography", Advances in Space Research 65 (2020) 891-901.
Cassel, Ryan, "Real-Time ARAIM Using GPS, GLONASS, and GALILEO", Submitted in partial fulfillment of the requirements for the degree of Master of Science in Mechanical and Aerospace Engineering in the Graduate College of the Illinois Institute of Technology, May 2017.
Chiu, David S., et al., "Bierman-Thorton UD Filtering for Double-Differenced Carrier Phase Estimation Accounting for Full Mathematical Correlation", Jan. 2008, ION NTM 2008, pp. 756-762., Jun. 23, 2017 00:00:00.0.
Davidson, Pavel, et al., "Improved Vehicle Positioning in Urban Environment through Integration of GPS and Low-Cost Inertial Sensors", European Navigation Conference, ENC-GNSSAt: Naples, Italy, May 2009.
Drescher, Ralf, "Fast convergence of Trimble CenterPoint RTX by regional augmentation", Trimble Terrasat GmbJ, Munich, EGU General Assembly 2015, Vienna, Thursday, Apr. 16, 2015.
Favey, Etienne, et al., "Dead reckoning fills-in GPS navigation gap", EE Times, Automotive Designline, Aug. 18, 2011.
Feng, Shaun, et al., "Carrier phase-based integrity monitoring for high-accuracy positioning", GPS Solution, Apr. 2009.
Gratton, Livio, et al., "Carrier Phase Relative RAIM Algorithms and Protection Level Derivation", Journal of Navigation (2010), 63, 215-231, doi: 10.1017/S0373463309990403.
Gunning, Kazuma, et al., "Design and evaluation of integrity algorithms for PPP in kinematic applications", Proceedings of the 31st International Technical Meeting of the Satellite Division of the Institute of Navigation (ION GNSS+ 2018) Sep. 24-28, 2018, Hyatt Regency Miami, Miami, Florida.
Henkel, Patrick, et al., "Joint L-/C-Band Code and Carrier Phase Linear Combinations for Galileo", International Journal of Navigation and Observation, vol. 2008, Article ID 651437, 8 pages.

Hirokawa, Dr. Rui, "Recent Activity of International Standardization for High-Accuracy GNSS Correction Service", Mitsubishi Electric, Jun. 27, 2019.
Huang, Panpan, "Airborne Gnss Ppp Based Pseudolite System", School of Civil and Environmental Engineering faculty of Engineering UNSW. Jun. 2019.
Karaim, Malek, et al., "GNSS Error Sources", https://www.intechopen.com/books/multifunctional-operation-and-application-of-gps/gnss-error-sources, published Apr. 6, 2018.
Khanafseh, Samer, et al., "GNSS Multipath Error Modeling for Automotive Applications", Abstract only, Proceedings of the 31st International Technical Meeting of the Satellite Division of the Institute of Navigation (ION GNSS+ 2018), Miami, Florida, Sep. 2018, pp. 1573-1589, https://www.ion.org/publications/abstract.cfm?articleID=16107.
Kilic, Cagri, et al., "ZUPT Aided GNSS Factor Graph with Inertial Navigation Integration for Wheeled Robots", Proceedings of the 34th International Technical Meeting of the Satellite Division of the Institute of Navigation (ION GNSS+ 2021) Sep. 20-24, 2021.
Kissai, Ali, et al., "UAV Dead Reckoning with and without using INS/ GPS Integrated System in GPS denied Polar Region", International Journal of Aeronautics and Aerospace Engineering, ISSN: 2643-8224, 10 pages, published Aug. 26, 2019.
Ko, Jonathan, et al., "GP-UKF: Unscented kalman filters with Gaussian process prediction and observation models", Conference Paper, Dec. 2007, 10.1109/IROS.2007.4399284.
Kuusniemi, Heidi, et al., "GNSS Signal Reliability Testing in Urban and Indoor Environments", Proceedings of NTM 2004 Conference (Session A2), San Diego, CA, Jan. 26-28, 2004, The Institute of Navigation.
Lee, Jae Ho, et al., "A Two-antenna GPS Receiver Integrated with Dead Reckoning Sensors", ION Institute of Navigation, Proceedings of the IAIN Work Congress and the 56th Annual Meeting of the Institute of Navigation, Jun. 26-28, 2000, 4 pages.
El, YU, et al., "Prediction of Navigation Satellite Clock Bias by Gaussian Process Regression", Lecture Notes in Electrical Engineering 342:411-423, Jan. 2015.
Li, T., et al., "Some remarks on GNSS integer ambiguity validation methods", Survey Review, Dec. 5, 2012, vol. 44, No. 326.
Lin, Ming, et al., "Robust Gaussian Process Regression for Real-Time High Precision GPS Signal Enhancement", www.gps.gov/systems/gps/performance/accuracy, Jun. 5, 2019.
Liu, Haiying, et al., "A closed-loop EKF and multi-failure diagnosis approach for cooperative GNSS positioning", Engineering, GPS Solutions, Published 2015.
Madrid, Navarro, et al., "New Approach for Integrity Bounds Computation Applied to Advanced Precise Positioning Applications", Proceedings of the 28th International Technical Meeting of the Satellite Division of the Institute of Navigation (ION GNSS+ 2015) Sep. 14-18, 2015, Tampa Convention Center, Tampa, Florida.
Meng, Xiaoli, et al., "A Robust Vehicle Localization Approach Based on GNSS/IMU/DMI/LiDAR Sensor Fusion for Autonomous Vehicles", Sensors, 2017, 17, 2140.
Odijk, Dennis, et al., "On the estimability of parameters in undifferenced, uncombined GNSS network and PPP- RTK user models by means of S-system theory", Journal of Geodesy, Nov. 2015.
Peng, Hao, et al., "Covariance Fusion Strategy of Gaussian Processes Covariance and Orbital Prediction Uncertainty", Conference: AAS/AIAA Astrodynamics Specialist Conference, Portland, ME, Aug. 2019.
Pervan, Boris, et al., "Shaping Aviation Integrity Two RAIMs for Safety", GPS World The Business and Technology of Global Navigation and Positioning, Apr. 1, 2008.
Phelts, R. Eric, et al., "Innovation: Improving ARAIM, An approach using precise point positioning", GPS World, Jun. 13, 2020, https://www.gpsworld.com/innovation-improving-araim/.
Pullen, Sam, "Augmented GNSS: Fundamentals and Keys to Integrity and Continuity", Department of Aeronautics and Astronautics, Stanford University, Stanford, CA 94305-4035 USA, Tuesday, Sep. 20, 2011 1:30-5:00 PM Oregon Convention Center, Portland, Oregon.

(56) References Cited

OTHER PUBLICATIONS

Rasmussen, C.E., et al., "Gaussian Processes for Machine Learning", MIT Press, 2006, ISBN 026218253X. c 2006 Massachusetts Institute of Technology, (Year: 2006).

Rodriguez-Solano, Carlos, et al., "Protection Level of the Trimble RTX Positioning Engine for Autonomous Applications", Proceedings of the 34th International Technical Meeting of the Satellite Division of The Institute of Navigation (ION GNSS+ 2021), Sep. 20-24, 2021.

Satirapod, Chalermehon, "Improving the GPS Data Processing Algorithm for Precise Static Relative Positioning", School of Surveying and Spatial Information Systems The University of New South Wales. Jan. 2002.

Schmitz, Martin, "RTCM State Space Representation Messages, Status and Plans", PPP-RTK & Open Standards Symposium, Mar. 12-13, 2012, Frankfurt, Germany.

Shapiro, Larry S., et al., "Rejecting Outliers and Estimating Errors in an Orthogonal-Regression Framework", Phil. Trans. R. Soc. Load. A (1995)350, 407-439. (Year:1995).

Skog, Isaac, et al., "A Low-Cost GPS Aided Inertial Navigation System for Vehicle Applications", 2005 13th European Signal Processing Conference, Sep. 4-8, 2005.

Snelson, Edward, et al., "Sparse Gaussian Process using Pseudo-inputs", NIPS'05: Proceedings of the 18th International Conference on Neural Information Processing Systems, Dec. 2005, pp. 1257-1264.

Subirana, J. Sanz, et al., "Carrier Phase Cycle-Slip Detection—Navipedia", https://gssc.esa.int/navipedia/index.php/Carrier_Phase_Cycle-Slip_Detection, published 2011.

Takasu, Tomoji, et al., "ION GNSS 2008 abstract submission Cycle slip detection and fixing by MEMS IMU/GPS Integration for mobile environment RTK-GPS", Tokyo University of Marine Science and Technology, ION GNSS 2008, abstract submission.

Teunissen, P.J.G., "GNSS Integer Ambiguity Validation: Overview of Theory and Methods", Proceedings of the ION 2013 Pacific PNT Meeting, Apr. 23-25, 2013, Marriott Waikiki Beach Resort & Spa, Honolulu, Hawaii, https://www.ion.org/publications/abstract.cfm?articleID=11030.

Teunissen, Peter J.G., et al., "Integer Aperture Estimation A Framework for GNSS Ambiguity Acceptance Testing", InsideGNSS, Mar./Apr. 2011, pp. 66-73, www.insidegnss.com.

Teunissen, P.J.G., "On the GPS widelane and its decorrelating property", Delft Geodetic Computing Centre, Journal of Geodesy (1997) 71: 577-587.

Thombre, Sarang, et al., "GNSS Threat Monitoring and Reporting: Past, Present, and a Proposed Future", The Journal of Navigation, Dec. 2017, DOI: 10.1017/S0373463317000911, https://www.researchgate.net/publication/321663256.

Titsias, Michael K., "Variational Learning of Inducing Variables in Sparse Gaussian Processes", http://proceedings.mlr.press/v5/titsias09a/titsias09a.pdf, 2009.

Urquhart, Landon, "An Analysis of Multi-Frequency Carrier Phase Linear Combinations for GNSS", Department of Geodesy and Geomatics Engineering, University of New Brunswick, Technical Report No. 263, Feb. 2009.

Urquhart, Landon, et al., "Innovation: Integrity for safe navigation", https://www.gpsworld.com/innovation-integrity-for-safe-navigation-provided-by-gnss-service/, GPS World, Feb. 12, 2020.

Van Diggelen, Frank, et al., "Google to improve urban GPS accuracy for apps", Dec. 9, 2020, Android Developers Blog.

Van Graas, Frank, et al., "Precise Velocity Estimation Using a Stand-Alone GPS Receiver", Abstract only, Journal of the Institute of Navigation, vol. 51, No. 4, Winter 2004-2005, pp. 283-292, https://www.ion.org/publications/abstract.cfm?articleID=102384.

Verhagen, S., "The GNSS integer ambiguities: Estimation and validation", Aerospace Engineering, Jan. 31, 2005.

Waserman, Eyal, et al., "A Mixed Integer Least-Squares Formulation of the GNSS Snapshot Positioning Problem", https://github.com/eyalw711/snapshot-positioning, Jun. 2, 2021.

Yang, Wenhao, et al., "An Improved Relative GNSS Tracking Method Utilizing Single Frequency Receivers", Sensors 2020, 20, 4073; doi:10.3390/s20154073 www.mdpi.com/journal/sensors, 19 pages.

Zhu, Ni, et al., "GNSS Position Integrity in Urban Environments: A Review of Literature", IEEE Transactions on Intelligent Transportation Systems, 2018, 17p., 10.1109/TITS.2017.2766768.hal-01709519.

Ibrahim, Hassan E., et al., "A Regional Stochastic Model for NOAA-Based Residual Tropospheric Delay", ION NTM 2008, Jan. 28-30, 2008, San Diego, CA.

Wubbena, Gerhard, et al., "RTK Networks based on Geo++ GNSMART—Concepts, Implementation, Results", ION GPS 2001, Sep. 11-14, 2001, Salt Lake City, UT.

Bijl, Hildo, et al., "Online sparse Gaussian process regression using FITC and PITC approximations", IFAG-Papers on Line vol. 48, Issue 28, 2015, pp. 703-708 (Year: 2015).

Cole, D.A., et al., "Locally induced Gaussian processes for large-scale simulation experiments", Stat Comput 31, 33 (2021). https://doi.org/10.1007/s11222-021-10007-9 (Year: 2021).

Erickson, Collin B., et al., "Comparison of Gaussian Process Modeling Software", European Journal of Operational Research 266 (2018) 179-192 (Year: 2018).

Inyurt, Samed, et al., "Ionospheric TEC Forecasting Using Gaussian Process Regression (GPR) and multiple Linear Regression (M LR) in X Turkey", Astrophys Space Sci (2020) 365:99, https://doi.org/10.1007/s10509-020-03817-2 (Year: 2020).

Lin, Ming, et al., "Robust Gaussian Process Regression for Real-Time High Precision GPS Signal Enhancement", Applied Data Science Track Paper. KDD '19, Aug. 4-8, 2019, Anchorage, AK, USA (Year: 2019).

Quinonero-Candel, Joaquin, et al., "A Unifying View of Sparse Approximate Gaussian Progress Regression", Journal of Machine Learning Research 6 (2005) 1939-1959. (Year: 2005).

\* cited by examiner a continuation of U.S. patent application Ser. No. 17/374,523, filed 13 Jul. 2021 which claims the benefit of U.S. Provisional Application No. 63/051,007, filed 13 Jul. 2020, each of which is incorporated in its entirety by this reference.

TECHNICAL FIELD

This invention relates generally to the GNSS positioning field, and more specifically to a new and useful system and method in the GNSS positioning field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 2:
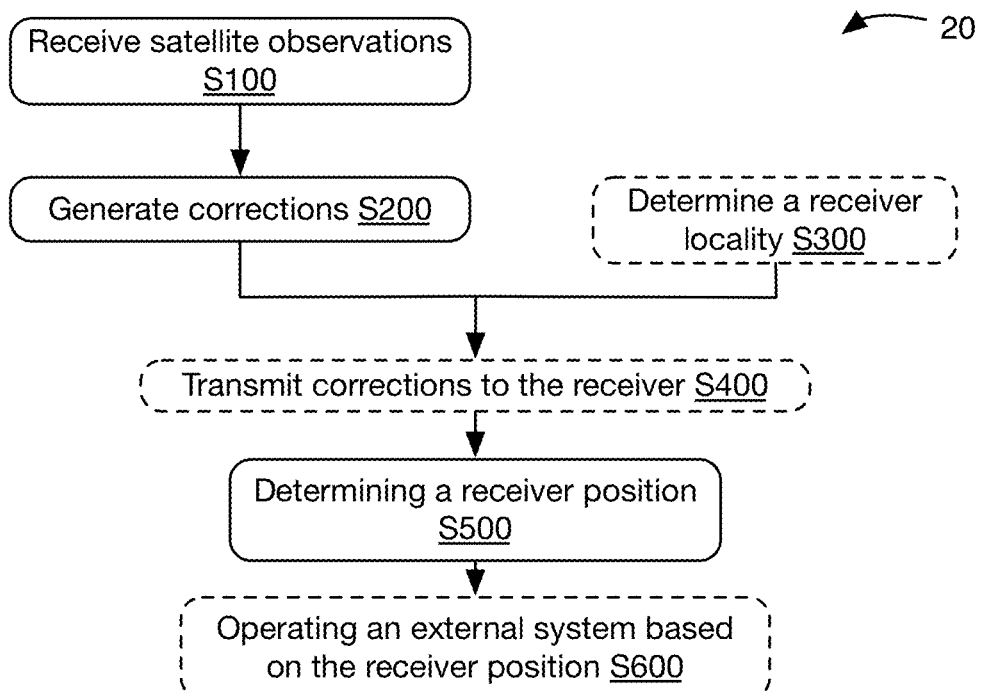
FIG. 2 is a schematic representation of the method.

As shown in FIG. 2, the method 20 can include receiving satellite observations S100 and generating a set of corrections S200, where a receiver position can be determined using the corrections (e.g., in step S500). The method can optionally include determining a receiver locality S300, transmitting corrections based on the receiver locality S400, operating an external system based on the receiver position S600, and/or any suitable steps.

Figure 1:
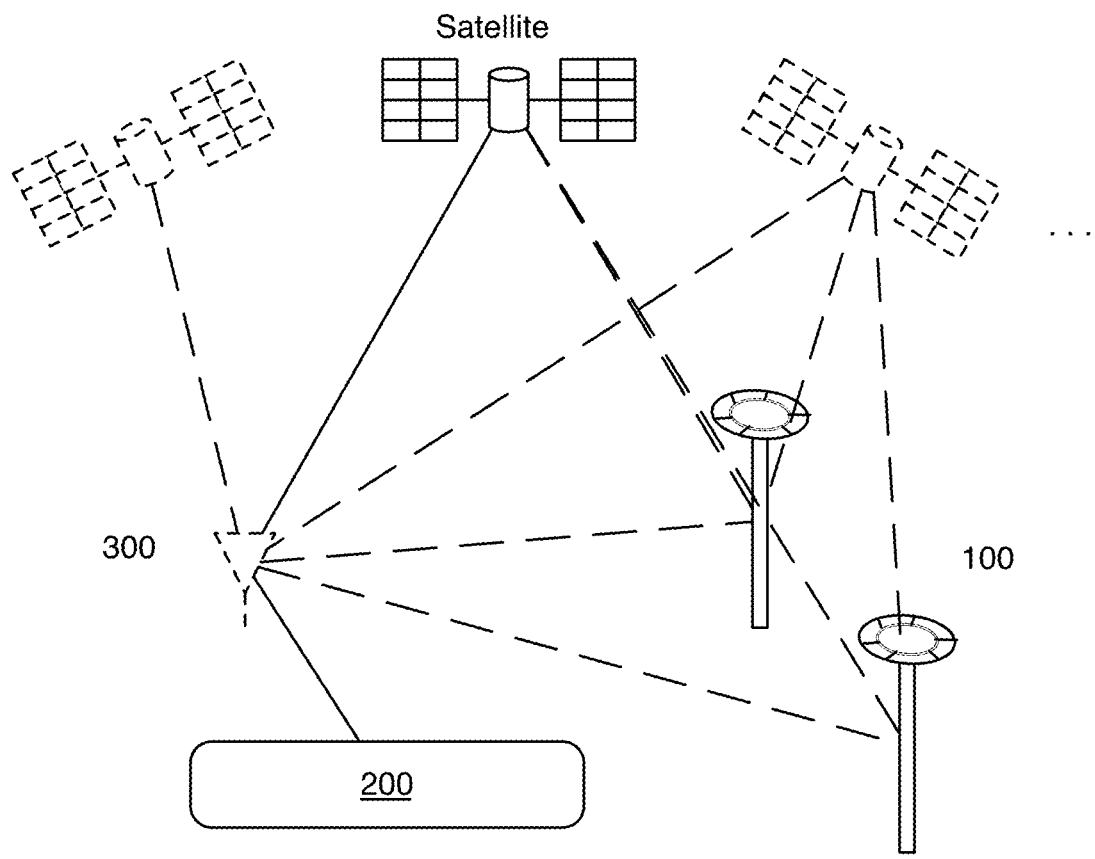
FIG. 1 is a schematic representation of the system.

As shown in FIG. 1, the system 10 can include one or more data sources 100, one or more computing systems 200, one or more GNSS receivers 300, and/or any suitable components.

The system and method preferably function to generate corrections (e.g., GNSS corrections) that can be used to determine and/or refine a receiver position with a high accuracy (e.g., cm-level, dm-level, m-level, etc.) and/or integrity. However, the corrections can be otherwise used.

Embodiments of the system and/or method can be used, for example, in autonomous or semi-autonomous vehicle guidance (e.g., for unmanned aerial vehicles (UAVs), unmanned aerial systems (UAS), self-driving cars, agricultural equipment, robotics, rail transport/transit systems, autonomous trucking, last mile delivery, etc.), GPS/GNSS research, surveying systems, user devices, mobile applications, internet-of-things (IOT) devices, and/or may be used in any other suitable application. In specific examples, the system (and/or components) can be coupled to any suitable external system such as a vehicle (e.g., UAV, UAS, car, truck, etc.), robot, railcar, user device (e.g., cell phone), and/or any suitable system, and can provide positioning data, integrity data (e.g., protection level data), and/or other data to said system, wherein the system can use the data for control and/or navigation.

2. Benefits.

Variations of the technology can confer several benefits and/or advantages.

First, variants of the technology can ensure continuity of corrections data availability across a geographical region (e.g., neighborhood, city, county, parish, state, country, continent, global, ocean, sea, lake, etc.) such as when a receiver is moving with the geographical region (e.g., above a threshold velocity). Examples of the technology enable continuity by overlapping the tiles (correction tiles) that the corrections correspond to, such that a receiver receives correction information for the current location in addition to the adjoining geographic regions (e.g., instead of receiving correction information for the current location only). This enables the adjoining region's corrections to be determined when the receiver enters the adjoining geographic region, even though the receiver has not received a tile addressed to said region (e.g., due to update lag or connectivity issues).

Second, variants of the technology can ensure that the corrections are valid and/or usable over the entire geographic region. In specific examples, by splitting the corrections for each tile into a continuous correction and a discrete correction, the discrete correction can correct for variations (e.g., residual errors) in the continuous corrections between correction tiles. In a second example, having a larger validity region than transmission region for tiles can help ensure that the corrections the receiver is using remain valid after the receiver has received the corrections (e.g., if an outage occurs, if communications are delayed, because of receiver motion, etc.).

Third, variants of the technology can use minimal data to determine and/or transmit the corrections from a remote computing system to a receiver. In a specific example, the corrections to be transmitted to the receiver can be determined based on (e.g., based only on) the receiver locality. In related examples, the corrections to be transmitted to the receiver (e.g., to a client management resource) can be determined without knowledge of the receiver trajectory, position, velocity, and/or other kinematic information.

However, variants of the technology can confer any other suitable benefits and/or advantages.

3. System.

The system 10 can function to determine the position (and/or associated integrity such as integrity risk, protection level, etc.) of a receiver and/or corrections (e.g., GNSS corrections) such as corrections that can be used to facilitate or improve a position determination. However, the system can otherwise function.

The system preferably uses a set of data collected by one or more data sources 100. Data sources can include: receivers, sensors (e.g., located onboard the receiver, the external system, the reference stations, etc.), databases, satellites 120, reference stations 110, and/or any other suitable data source. Examples of data that can be used include: satellite observations, sensor observations, and/or any other suitable data.

The receiver preferably functions to receive a set of satellite observations (e.g., satellite signals such as carrier phase and satellite code) from one or more satellites. In variants, the receiver can determine the location of the receiver (and/or external system) based on the satellite observations. The receiver is preferably in communication with the computing system. However, the receiver can be integrated with the computing system, and/or the receiver and computing system can be arranged in any suitable manner. The receiver is preferably a stand-alone device (e.g., a GNSS receiver, antenna). However, the receiver can be integrated into an external system (e.g., be a component of an automobile, aero vehicle, nautical vehicle, mobile device, etc.), can be a user device (e.g., smart phone, laptop, cell phone, smart watch, etc.), and/or can be configured in any suitable manner.

The set of satellite observations can include orbital data (e.g., ephemeris), timestamp, range rate data, carrier phase data, pseudorange data, and/or any suitable data. The set of satellite observations can include and/or be associated with metadata (e.g., ephemeris data) and/or any suitable data or information. The set of satellite observations preferably includes satellite observations corresponding to satellites from a plurality of satellite constellations (e.g., Global Positioning System (GPS), GLObal NAvigation Satellite System (GLONASS), BeiDou navigation satellite System (BDS), Galileo, Quasi-Zenith Satellite System (QZSS), etc.). However, the set of satellite observations can correspond to satellites from a single satellite constellation, can include data from an augmentation system (e.g., Satellite Based Augmentation System (SBAS) such as Wide Area Augmentation System (WAAS), European Geostationary Navigation Overlay Service (EGNOS), Multi-Functional Satellite Augmentation System (MSAS), GPS Aided Geo Augmented Navigation (GAGAN), Omnistar, StarFire, etc.; Ground Based Augmentation Systems (GBAS) such as Local Area Augmentation System (LAAS); etc.), and/or can include any suitable data.

In variants of the system including more than one receiver, each receiver can be configured to receive satellite observations corresponding to a satellite constellation, to a carrier frequency (e.g., the L1, L2, L5, E1, E5a, E5b, E5ab, E6, G1, G2, G3, B1, B2, B2a, B2b, B2ab, B3, LEX, etc. frequencies), and/or corresponding to any suitable source.

The reference station(s) preferably function to receive a set of satellite observations (e.g., reference station satellite observations) and transmit the reference station satellite observations to the computing system (and/or to the receiver). The satellite observations from the reference station(s) can be used to determine corrections (e.g., local and/or global corrections such as to account for atmospheric effects such as ionosphere delay, troposphere delay, ionosphere gradient, etc.; orbit errors; clock errors; hardware biases; antenna offsets such as phase center offset, phase center variation, etc.; ocean tides; pole tides; solid Earth tides; etc.) to the set of satellite observations measured (or otherwise received) by the receiver. Each reference station is preferably communicably coupled to the computing system. However, the reference station can include the computing system and/or be coupled to the computing system in any suitable manner. The reference stations can be in communication (e.g., via a direct communicable link, via an intermediary computing system, etc.) with the receiver. The reference station(s) are preferably located within about 500 km of the receivers, but the distance between the reference stations and the receiver can be any distance.

The reference station satellite observations can correspond to the same and/or a different set of satellites as the set of satellite observations received by the receiver. However, the reference station satellite observations can correspond to any suitable satellite observations.

The location (e.g., position) of the reference station(s) is preferably known to a high degree of accuracy (e.g., less than 1 mm, 1 cm, 1 dm, 1 m, etc. of uncertainty in the location of the reference station). The location of the reference station(s) can be static and/or dynamic.

The computing system preferably functions to process the data (e.g., satellite observations) from the receiver and/or the reference stations. The computing system can: aggregate the data (e.g., combine the receiver satellite observations, reference station satellite observations, and sensor data; reorganize the receiver satellite observations, reference station satellite observations, and sensor data such as based on the time stamp, time of transmission, time of receipt; etc.), filter the data (e.g., to calculate state vectors, ambiguities such as phase ambiguities, etc. associated with the data), calculate the receiver position (e.g., based on ambiguities), correct the data (e.g., correct the satellite observations for orbit errors, clock errors, hardware biases, antenna offsets, atmospheric effects, ocean tides, pole tides, etc.), generate corrections (e.g., global corrections, local corrections, atmospheric corrections, etc.), and/or can process the data in any suitable manner. The computing system can be local (e.g., on-board the external system, integrated in a receiver, integrated with a reference station, etc.), remote (e.g., cloud computing, server, networked, etc.), and/or distributed (e.g., between a remote and local computing system).

The corrections are preferably used to correct one or more satellite observations. The corrections can correspond to individual satellites, sets of satellites, satellite constellations, satellite frequencies, every satellite, reference stations, and/or to any data source. For example, the corrections can be used to correct the satellite observations for atmospheric effects (e.g., ionosphere delays such as for each satellite, for each satellite frequency, etc.; troposphere delays such as for dry or hydrostatic delay component, for wet or non-hydrostatic delay components, for a given satellite, etc.; etc.), global errors (e.g., hardware biases, orbit errors, clock errors, satellite antenna offsets, ocean tides, pole tides, etc.), and/or any error source. The corrections can correspond to RTK corrections, PPP corrections, PPP-RTK corrections, and/or any suitable corrections. The corrections can be updated (e.g., at a predetermined time such as based on the type of correction, the intended application, the external system, the target receiver position accuracy, target receiver position integrity, etc.) and/or fixed. The corrections can be updated at predetermined times (e.g., 1 s, 5 s, 10 s, 30 s, 60 s, 2 min, 5 min, 10 min, 20 min, 30 min, 60 min, 2 hr, 4 hr, 8 hr, 12 hr, 24 hr, values there between, etc.), responsive to a trigger (e.g., change in weather, change in temperature, change in receiver position, change in satellites in view of the receiver, threshold change in line of sight vector between the satellite and receiver, etc.), manually (e.g., responsive to a user request for updated corrections), and/or with any suitable timing. In one example, each correction type for each tile can be continuously updated at varying rates of change. The corrections can be associated with a validity period, wherein the corrections can be invalid outside of the validity period (e.g., and must be refreshed), or permanently valid (e.g., until a new correction is calculated).

The corrections are preferably SSR corrections (e.g., state space representation corrections), but can alternatively be OSR corrections (e.g., observation space representation corrections) and/or other corrections. Each correction within the set can correct for a different error (e.g., clock error, orbit error, atmospheric errors, hardware biases such as code and phase bias errors, etc.), and can be sent at the same or different update frequencies. For example, long-lived component corrections can be sent infrequently, while highly-variant component corrections are sent more frequently. In another example, spatially-invariant component corrections (e.g., clock error, obit error, hardware biases, antenna offset, pole tide, etc.), can be sent less frequently than spatially-variant components (e.g., atmospheric error, ocean tide, etc.) for moving receivers. However, the corrections can be transmitted with any suitable timing.

In specific examples, the corrections can be determined (e.g., generated) using particle filters (e.g., Kalman filter, extended Kalman filters, etc.), using models, using a gaussian process (e.g., as disclosed in U.S. patent application Ser. No. 16/983,706 titled "SYSTEM AND METHOD FOR GAUSSIAN PROCESS ENHANCED GNSS CORRECTIONS GENERATION" filed 3 Aug. 2020 incorporated in its entirety by this reference), as disclosed in U.S. patent application Ser. No. 16/589,932 titled 'SYSTEMS AND METHODS FOR DISTRIBUTED DENSE NETWORK PROCESSING OF SATELLITE POSITIONING DATA' filed 1 Oct. 2019, incorporated in its entirety by this reference, and/or in any manner.

Each correction 1000 is preferably associated with (e.g., validated in, accurate within, transmitted within, etc.) at least one tile 1100 (e.g., regions such as of a tiled map, geographic area, unique geographic area, etc.). Having the corrections correspond to or associated tiles can have the benefit of transmitting only the relevant information to a receiver, which can decrease the bandwidth requirements for the system. However, the corrections can be used for a wide region (e.g., city, county, parish, country, continent, ocean, sea, lake, etc.), global, point based, and/or be used for any suitable region. The tiles (e.g., geographic extent, shape, etc.) can be predetermined (e.g., predefined, retrieved from memory, etc.), dynamically determined (e.g., determined based on the satellite observations, the reference stations, the receivers, the application, the target receiver position accuracy, the target receiver position integrity, the receiver application etc.), and/or otherwise determined. In a first variant, each tile includes corrections for a set of errors (e.g., spatially invariant corrections and spatially variant corrections). In a second variant, each tile can include corrections for specific errors (e.g., one or more spatially invariant corrections, one or more spatially variant corrections). However, each tile can include or be associated with any corrections.

The size of the tiles are preferably selected such that the corrections do not vary significantly (e.g., less than 1%, 2%, 5%, 10%, 20%, etc.; such that low order polynomials or other simple fitting functions can accurately, for instance having a high regression coefficient such as greater than 0.8, 0.9, 0.95, etc. or otherwise having a high goodness of fit, represent the corrections; etc.). However, the size of the tiles can be determined based on the corrections to be generated, the corrections (e.g., corrections with greater variability can have a smaller tile size), be predetermined, depend on an application of the GNSS receiver position or external system, depend on a target accuracy or integrity of the position, and/or can otherwise be chosen. The tiles can be the same or different sizes. In a first specific example, each tile (e.g., geographic region, validity region, area, etc.) can be an approximately 5° latitude by approximately 5° longitude geographic region (e.g., between about 1°-10°, 2°-5°, 5°-10°, 4.5°-5.5°, 4°, 3°, 2°, 1°, etc. latitude and/or longitude). In a second specific example, each tile can be an approximately 500 km by 500 km (e.g., 500±100 by 500±100 km, 500±200 km, 500±250 km, etc.) geographic region. However, tiles can have an extent smaller than 1° (latitude or longitude), an extent less than about 250 km, an extent greater than about 750 km, and/or any suitable size.

The tiles can be aligned to grid points (e.g., start and/or end on grid points), reference points (e.g., landmarks, reference stations, etc.), predetermined locations, randomly aligned, aligned to latitude and/or longitude, have any orientation or alignment relative to the grid points, and/or be aligned to any reference. The tile grid points are preferably the same as corrections grid points (e.g., in variants where the corrections include grid points), but can be different from and/or unrelated to the corrections grid points. The tiles are preferably at fixed locations. However, the tile locations can be updated, can change, and/or can be otherwise positioned.

The tiles are preferably overlapping (e.g., have an areal overlap). However, the tiles can additionally or alternatively be adjacent to other tiles, touching or contiguous (e.g., along one or more edge, at one or more corner, at one or more point, etc.), nested, nonadjacent (e.g., including a separation region between tiles), and/or be otherwise arranged. The tiles preferably overlap by between about 10-50% (e.g., overlapping area of 10-50%), but can overlap less than 10% or greater than 50%. The tiles can be overlapped along a reference axis (e.g., latitude, longitude, a reference axis that intersects a longitude or latitude by any angle, etc.), in a predetermined shape, by a predetermined number of grid points, and/or be otherwise overlapped. In a specific example, as shown for example in FIG. 4, between 2-4 tiles can overlap in (e.g., provide coverage for) a given region. In a second specific example, adjacent tiles (e.g. unique geographic areas) can overlap by at least 0.0° latitude or 0.01° longitude (e.g., 0.01°, 0.05°, 0.1°, 0.5°, 1°, 2°, 3°, 5°, values therebetween, >5°, etc. latitude and/or longitude). However, adjacent geographic areas can overlap by less than 0.01° (latitude and/or longitude). However, a single tile can be used in a region, and/or any number of tiles can overlap for a region.

In an illustrative example, adjacent tiles can overlap by one grid point (e.g., along one or more axis, as shown for example in FIG. 4, etc.) such that one grid point is contained within the tile (e.g., not counting grid points along an edge or surface of the tile). However, adjacent tiles can otherwise overlap (e.g., by more than one grid point, by less than one grid point, etc.).

Typically, adjacent tiles have overlapping validity regions, but not overlapping transmission regions, which can function to have a single set of corrections transmitted at a time. However, additionally or alternatively, a transmission region can be overlapping between adjacent tiles (e.g., geographic regions).

Adjacent (e.g., adjacent overlapping tiles; adjacent non-overlapping tiles, etc.) tiles can: share corrections (e.g., share grid points), be piecewise continuous (e.g., be discontinuous at the boundaries), be regularized (e.g., be smoothed at the boundaries), and/or be otherwise related. Overlapping tiles preferably provide the same correction values (e.g., the same corrections values within ±0.01%, ±0.02%, ±0.05%, ±0.1%, ±0.2%, ±0-5%, 1%, 2%, 5%, 10%, 20%, etc.) within the overlapping region, but can provide different correction values.

Figure 4:
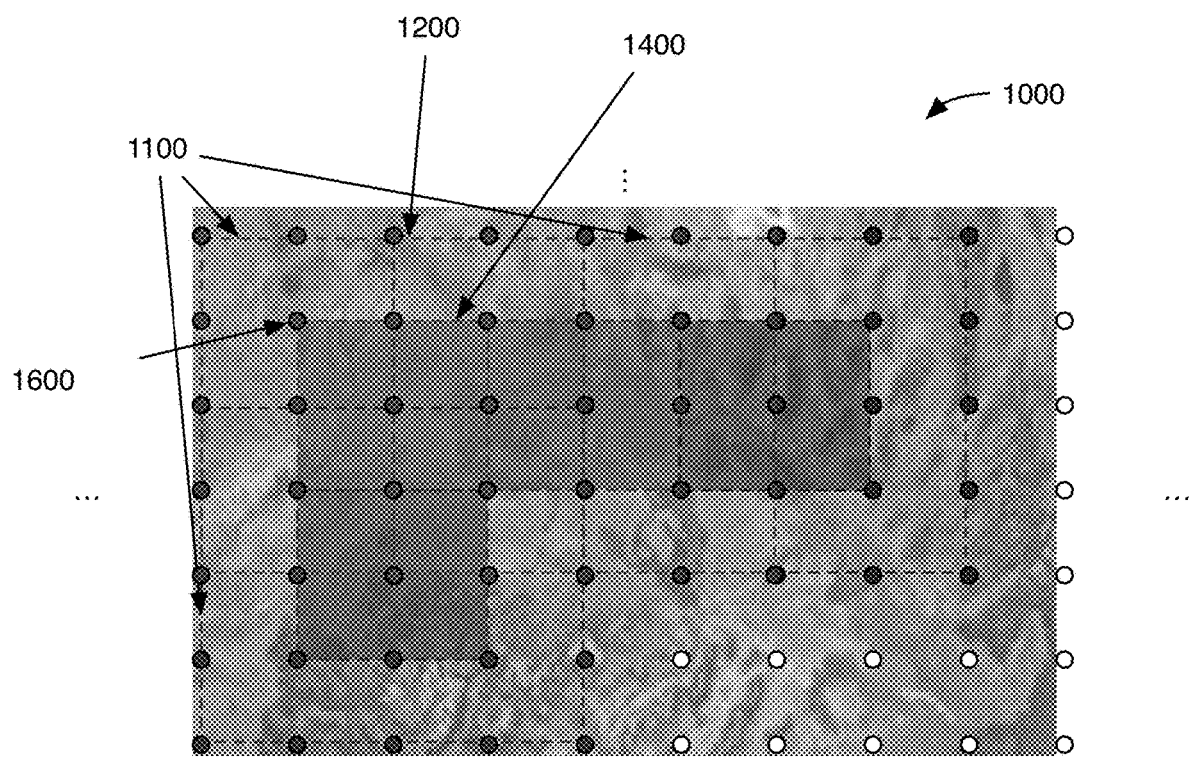
FIG. 4 is a schematic representation of an example of tiled corrections.

As shown for example in FIG. 4, each tile 1100 preferably includes a validity region 1200 and a transmission region 1400. The validity region 1200 preferably corresponds to the region over which the correction(s) are valid and/or accurate such that the correction can be used to determine the receiver position (e.g., to achieve a target accuracy and/or integrity).

The validity region is preferably identical to the tile (e.g., the same size as the tile), but can be a subset of and/or superset of the tile. The transmission region 1400 preferably corresponds to the region over which the correction corresponding to the tile is transmitted (e.g., the tile or corrections for the validity region are transmitted to the receiver when the receiver is located within the transmission region). The validity region preferably encompasses (e.g., surrounds, circumscribes, etc.), and is preferably larger than, the transmission region. As such, the corrections are preferably valid in the transmission region, but can be invalid and/or unvalidated in the transmission region. However, the validity region and the transmission region can be the same size, the validity region and the transmission region can be overlapped, the transmission region can surround (e.g., encompass, circumscribe) the validity region, the validity region and the transmission region can be proximal and/or adjacent to one another (e.g., but not overlapping), and/or the validity region and the transmission region can be otherwise arranged. The validity region and/or the transmission region are preferably fixed, but can vary (e.g., based on receiver kinematics, based on changes or lack thereof in the corrections, etc.). The validity and/or the transmission region can be predetermined; can depend on receiver properties (e.g., receiver kinematics, receiver hardware, etc.), external system properties, the set of satellites, the update time for corrections, the target receiver position accuracy, the target receiver position integrity, the target receiver application, and/or other properties; and/or otherwise be determined.

The transmission region is preferably located proximal a center or central region of the validity region (e.g., a center of the transmission region and a center of the validity region are coincident or nearly coincident). However, a transmission region can be located proximal an edge, a vertex, unrelated to (e.g., set based on a landmark), and/or otherwise arranged relative to the validity region.

Transmission regions for two or more tiles (e.g., adjacent tiles) preferably abut (e.g., touch along or share an edge, portion thereof, and/or vertex), but do not overlap (e.g., do not have an areal overlap). However, the transmission regions for two or more tiles can be overlapping, can have a gap (e.g., a space not associated with a transmission for any of the two or more tiles), and/or can otherwise be related.

In an illustrative example (as shown for example in FIG. 4), a validity region can be about 5° latitude by 5° longitude and a transmission region can be about 3° latitude by 3° longitude. In a related example, a validity region can be bounded by about 5 grid points (e.g., in each cardinal direction) and a transmission region can be bounded by about 3 grid points (e.g., in each cardinal direction). However, a transmission region can have any suitable size (e.g., extent in any direction) between about 0.010-100 (e.g., 0.01°-1°, 0.1°-5°, 1°-3°, 1°-10°, 2°-5°, 5°-10°, 4.5°-5.5°, 4°, 3°, 2°, 1°, etc. latitude and/or longitude), an extent smaller than 0.1° (latitude or longitude), an extent greater than 10°, an extent between 10 km and 750 km (e.g., 10-500 km, 25-100 km, 50-250 km, 100-300 km, 10 km, 25 km, 50 km, 100 km, 200 km, 500 km, etc.), less than about 10 km, an extent greater than about 750 km, and/or any suitable size.

Each tile can be the same as (e.g., same area, same dimensions, same shape, etc.) or different (e.g., different area, different dimensions, different shape, etc.) from other tiles. For instance, different sizing of each tile can be chosen to maintain an area as the tiles approach the poles (e.g., North and South pole), to maintain a validity of the corrections as the tiles approach the poles, and/or the size of each tile can otherwise be chosen.

The tiling is preferably a periodic tiling that effectively covers the surface of the earth. However, the tiling can be nonperiodic, can cover a subset of the surface of the earth (e.g., between latitude 0°-85°, -85°-85°, -80°-80°, -75°-75°, etc.), and/or be any suitable tiling. Each tile is preferably a regular polygonal tiling (e.g., using rectangular; triangular such as right triangle, isosceles triangle, scalene triangle, etc.; or hexagonal tiles), but can additionally or alternatively use irregular polygonal tiling, mixed tiles (e.g., tiles with two or more shapes), using a wallpaper group, and/or any suitable tiling. In an illustrative example, each tile can be a square or rectangle confined to a spheroid (e.g., an oblate spheroid). In variations of this illustrative example, the vertices of the square are preferably aligned to the ordinal (also called intercardinal directions) i.e., northeast, southeast, northwest, southwest. However, the vertices of the square can be aligned to the cardinal directions (i.e., north, south, east, west), and/or have any suitable orientation. However, any suitable tiling can be used.

Typically, corrections associated with a tile are valid for (e.g., can be used at) any altitude. For example, a mapping function (e.g., fixed height mapping function, IRI model, Chapman model, varying height mapping function, global mapping function (GMF), vienna mapping functions (VMF), mapping function as defined or used in conjunction with global pressure and temperature (GPT) model, mapping function as defined or used in conjunction with GPT2 model, Niell mapping function, etc.) can be used to map the delay from the zenith direction to the elevation angle of the signal. However, the corrections can vary with altitude. In such circumstances, each tile can define a volume with a depth (e.g., extent along altitude) that is usually between 0-10 miles, but can be greater than 10 miles (e.g., to use GNSS satellites for positioning other satellites and/or interstellar objects).

In variants, the corrections can include continuous corrections, discrete corrections, and/or any suitable corrections. The continuous corrections preferably function to provide a coarse correction for errors. The discrete corrections preferably function to adjust and/or improve the continuous corrections (e.g., to provide a fine adjustment to the continuous correction). The continuous corrections and the discrete corrections can each include and/or be associated with spatially invariant corrections (e.g., global corrections such as to correct for satellite orbit, satellite hardware biases, satellite clock errors, satellite antenna offsets, pole tides, etc.) and/or to spatially varying corrections (e.g., local corrections such as to correct for atmospheric effects including ionosphere delay, ionosphere slant delay, troposphere delay, ionosphere gradient, first-order ionosphere effects, second-order ionosphere effects, etc.; multipath errors; ocean tides; etc.). In a specific example, the set of corrections includes both continuous corrections and discrete corrections. In a variation of this specific example, the continuous corrections and/or discrete corrections can include local corrections (e.g., for atmospheric effects). However, the set of corrections can include any suitable corrections. Typically, continuous corrections are associated with a single tile, while discrete corrections can be associated with a plurality of tiles (often 2-4, but it can be greater than 4). However, the continuous correction can be associated with a plurality of tiles, the discrete corrections can be associated with a single tile, and/or the continuous or discrete corrections can be associated with any suitable tile(s) or not associated with a tile.

The continuous and/or discrete corrections can be derived from a model of the corrections, the actual corrections (e.g., measured corrections values), a simulated corrections, and/or any suitable corrections. For example, the continuous and/or discrete corrections can be determined by fitting a model of the corrections.

The continuous corrections preferably include fitting functions (e.g., coefficients of the fitting equation, information used to derive the fitting coefficients, a fitting function degree such as polynomial degree, fitting function form, etc.), but can include any suitable equation, map, and/or any suitable continuous corrections. The fitting functions can be polynomial functions (e.g., linear, quadratic, cubic, quartic, quintic, spline, etc.), exponentials, rational equations, radical equations, trigonometric functions, logarithmic functions, logistic functions, and/or any suitable function. In a specific example, the fitting functions can include a second-order polynomial function in latitude, longitude, and/or altitude (e.g., including cross-terms such that the highest polynomial term is second order, excluding cross-terms such that the highest polynomial term can be fourth or sixth order, etc.). In a variation of this specific example, the second-order polynomial can be a bivariate polynomial function of degree at most 2 such as with latitude and longitude or east/west and north/south positions as the variables. In a second specific example, a first fitting function can be used that is second order (e.g., quadratic) in latitude, and a second fitting function can be used that is second order in longitude. In the first and second specific examples, polynomial fitting functions can be beneficial for balancing a bandwidth and/or amount of data to be transferred for the corrections with an accuracy (e.g., a goodness of fit); however, other fitting functions can be beneficial and/or polynomial fitting functions can confer any suitable benefit. However, any suitable fitting function can be used.

In a first specific example, a fitting function can only be associated with an ionosphere delay (e.g., a TEC delay, a VTEC delay, an STEC delay, etc.). In a second specific example, a fitting function can be associated with an ionosphere delay and a troposphere delay (e.g., a wet or non-hydrostatic component of tropospheric delay, a dry or hydrostatic component of a tropospheric delay, vertical tropospheric delay, etc.). However, a fitting function can be associated with any suitable data.

Each tile is preferably associated with a different fitting function (e.g., fitting function with different coefficients), but can be associated with the same fitting function. Fitting functions can be expanded about a central portion of an associated tile (e.g., the center of the tile), a vertex of the associated tile, an edge of the associated tile, a reference point (e.g., inside the tile, outside the tile), a grid point (e.g., a grid point as discussed below), an arbitrary point, a symmetric point (e.g., a point about which the corrections are symmetric or approximately symmetric, a point about which the corrections are antisymmetric or approximately antisymmetric, etc.), a asymmetric point, and/or any suitable expansion location.

The discrete corrections preferably correspond to grid point 1600 corrections (e.g., corrections corresponding to reference points or geolocations), but can correspond to a continuous model, grid lines (e.g., corrections corresponding to reference lines), grid surfaces (e.g., corrections associated with a grid surface), and/or any suitable model format. The grid points are preferably evenly spaced (e.g., forming a uniform grid), but can be unevenly spaced. The grid points can correspond to a regular grid (e.g., cartesian grid, rectilinear grid, skewed grid, curvilinear grid, etc.) and/or to an irregular grid. The grid points can correspond to predetermined locations (e.g., on the surface of the earth), reference station locations, receiver locations, broadcast tower locations, a geostationary orbit position, random or pseudorandom locations, virtual locations, imaginary locations, and/or to any suitable locations. The grid points can are preferably separated by between about 10-1000 km such as 50 km, 100 km, 200 km, 500 km, 750 km. In an illustrative example, the grid points can be spaced by about 1° latitude and/or 1° longitude (e.g., between adjacent or nearest neighboring grid points). However, the grid points can be separated by less than 10 km, more than 1000 km, 0.01°-10° latitude or longitude, less than 0.01° latitude or longitude, greater than 10° latitude or longitude, and/or by any suitable distance.

Tiles are preferably associated with between 3-1000 (such as 3, 4, 5, 6, 8, 10, 15, 20, 25, 30, 40, 50, 100, 150, 200, 300, 400, 500, 1000, values therebetween, etc.) grid points, less than 3 grid points (e.g., 0 grid points, 1 grid point, 2 grid points), greater than 1000 grid points, and/or any suitable number of grid points or other discrete corrections. The grid points can be along an edge of the tile, at vertices of the tile, at a centroid of the tile or portion thereof, randomly positioned, and/or otherwise be arranged relative to the tile. Each tile is preferably associated with the same number of grid points. However, different tiles can be associated with different numbers of grid points. In one example, each tile can be associated with exactly 25 grid points. In a second example, each tile can be associated with exactly 30 grid points. However, each tile can be associated with any number of grid points.

Figure 7A:
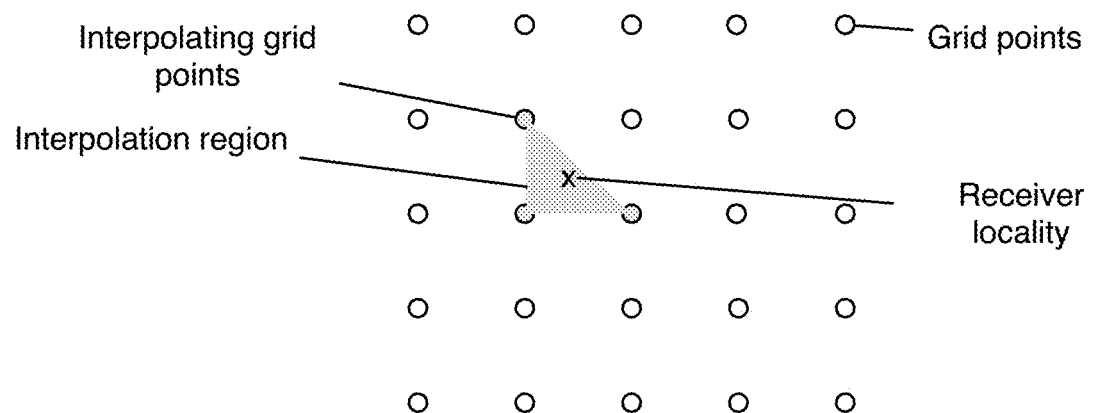
FIGS. 7A, 7B, and 7C are schematic representations of examples of interpolating between grid points.
Figure 7B:
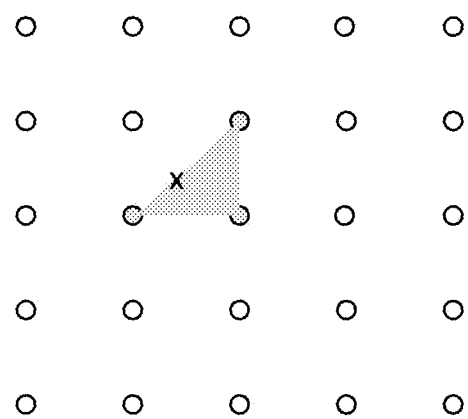
Figure 7C:
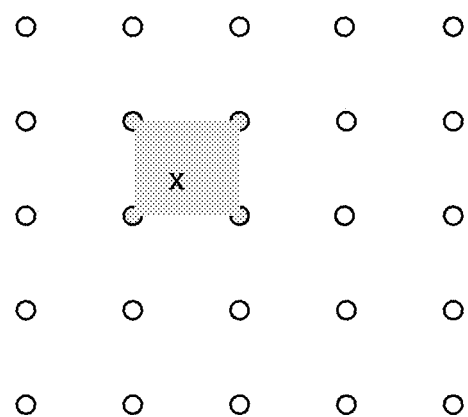

In variations, estimation techniques can be used to provide substantially continuous coverage over regions that do not correspond to the discrete locations and/or to determine the corrections for a particular location (e.g., a GNSS receiver location, a location that is not the same as a grid point, a location greater than a threshold distance from a grid point, etc.). Examples of estimation techniques include interpolation, extrapolation, rounding, selection of the nearest grid point, prediction (e.g., using machine learning), and/or other estimation techniques can be performed. These estimation techniques are preferably performed by the receiver (e.g., a computing system thereof), but can be performed by the corrections generator, a cloud computing service, and/or any suitable component. For example, the discrete corrections can be interpolated using: nearest neighbor interpolation, kriging, inverse distance weighting, natural neighbor interpolation, spline interpolation, radial basis function interpolation, Barnes interpolation, Bilinear interpolation, Bicubic interpolation, Bézier surface, Lanczos resampling, Delaunay triangulation, gradient enhanced kriging, polyharmonic spline (e.g., thin plate spline), and/or using any suitable interpolation methods. As shown for example in FIGS. 7A-7C, the interpolation can include: triangular interpolation (e.g., interpolate between 3 grid points), rectangular interpolation (e.g., interpolate between four grid points), and/or any suitable interpolation (e.g., interpolate between 2, 5, 6, 8, 10, 15, 20, 25, 100, values therebetween, etc. grid points).

When the estimation (e.g., interpolation, extrapolation, etc.) can have an orientation (e.g., as shown for example in FIGS. 7A and 7B, triangular interpolation, etc.), the orientation can be selected based on a kinematic parameter of the receiver (e.g., velocity, direction of travel, etc.), be randomly selected, be predetermined (e.g., be preset), be selected based on a validation or (anticipated) receiver position accuracy or integrity, be selected based on a validation of the corrections, be determined based on a preferred direction, and/or otherwise be selected. However, each orientation can be used (e.g., where the results can be averaged, selected from using voting, etc.) and/or any suitable orientation can be used.

The discrete corrections can be or include: a component correction for the geolocation (e.g., ionosphere correction, troposphere correction); a correction for a continuous correction (e.g., wherein the component correction is determined using a primary correction method, and the grid point correction adjusts the output result); and/or other correction. For example, each discrete correction can be associated with a residual value (e.g., a residual for a troposphere delay; a residual for an ionosphere delay such as a total electron count (TEC), a slant total electron count (STEC), a vertical total electron count (VTEC), etc. for one or more satellites of the set of satellites; etc. such as residuals after fitting a modeled correction to a fitting function), a variance or standard deviation of an atmospheric delay (e.g., for a troposphere, for the ionosphere, etc.), and/or any suitable information can be included or associated with a discrete correction point.

Discrete corrections can be associated with a single tile and/or with a plurality of tiles. Discrete correction overlapping multiple tiles can be determined (e.g., computed, averaged, etc.) based on all or a subset of the overlapped tile's continuous corrections (e.g., residuals from each continuous correction can be used to generate the discrete corrections). For example, the same grid point correction can correct all overlapped continuous corrections' outputs. However, different discrete corrections can be provided for each overlapping tile or otherwise be determined.

Each tile is preferably associated with a unique correction. However, more than one tile can correspond to the same correction. The corrections for each tile can be independent from (e.g., uncorrelated with) and/or dependent on the corrections for other tiles. In a first illustrative example, the discrete corrections can correct for residual differences resulting from differences in the continuous corrections between tiles. In a second illustrative example, the continuous corrections can be normalized, renormalized, regularized, and/or otherwise modified to ensure that the residuals (e.g., receiver position residual) is less than a threshold for receiver positions determined using corrections corresponding to different tiles. The second illustrative example can be beneficial when the residuals (e.g., residuals from using just the continuous corrections) cannot be constrained to less than a threshold, but can be used when the residuals are constrained to less than a threshold. In the second illustrative example, all of the tiles are preferably generated contemporaneously (e.g., at the same time, within a predetermined duration of one another), but can be generated with any suitable timing.

The computing system is preferably communicably coupled to the receiver, to the reference station, but the computing system can be in communication with any suitable components. In variants, the computing system can include one or more: communication module and corrections module. However, the computing system can include any suitable modules.

In specific examples, the system can include one or more components as described in U.S. patent application Ser. No. 16/983,706 titled "SYSTEM AND METHOD FOR GAUSSIAN PROCESS ENHANCED GNSS CORRECTIONS GENERATION" filed 3 Aug. 2020, U.S. application Ser. No. 16/817,196 titled "SYSTEMS AND METHODS FOR REAL TIME KINEMATIC SATELLITE POSITIONING" filed 12 Mar. 2020, U.S. application Ser. No. 16/865,077 titled SYSTEMS AND METHODS FOR HIGH-INTEGRITY SATELLITE POSITIONING" filed 1 May 2020, and/or U.S. application Ser. No. 16/589,932 titled "SYSTEMS AND METHODS FOR DISTRIBUTED DENSE NETWORK PROCESSING OF SATELLITE POSITIONING DATA" filed 1 Oct. 2019, each of which is incorporated its entirety by this reference, or otherwise configured.

4. Method.

The method preferably functions to determine GNSS corrections and/or estimate (e.g., calculate, determine) a receiver position (e.g., by leveraging or using the GNSS corrections). Steps and/or substeps of the method can be performed iteratively (e.g., for different epochs, for the same epoch, etc.), sequentially, and/or in any suitable order. The steps and/or substeps of the method can be performed in series and/or in parallel. The steps and/or substeps are preferably performed by a system as described above, but can be performed by any system.

Receiving the satellite observations S100 functions to measure and/or detect a set of satellite signals, where each satellite signal is associated with a satellite, at a reference station, a receiver, and/or at any suitable endpoint. Satellite signals corresponding to the same set of satellites are preferably received at the GNSS receiver and the reference station(s); however, the mobile receiver and the reference station(s) can receive satellite signals from any satellites. The satellite signals can include satellite code, satellite pseudorange, carrier phase, and/or any suitable data. Receiving the satellite observations S100 can include transmitting the satellite observations to the computing system and/or to the mobile receiver, monitoring the satellite observations (e.g., for a predetermined event, for faults, for outliers, etc.), and/or any suitable steps.

Determining GNSS corrections S200 functions to determine a set of GNSS corrections that can be used to estimate a receiver position and/or correct the set of satellite observations. The GNSS corrections are preferably determined by a computing system (e.g., a corrections generator, a remote computing system), but can be determined by any suitable component. The corrections are preferably determined based on satellite observations received at (e.g., observed by) one or more reference stations, but can be made based on any suitable data set. The satellite observations preferably correspond to one or more satellite positioning constellation (e.g., 2 satellite constellations, 3 satellite constellations, 4 satellite constellations, etc.), but can correspond to one or more auxiliary satellite constellations and/or any satellites. Determining the GNSS corrections can include: determining local corrections, determining global corrections, determining continuous corrections, determining discrete corrections, and/or any steps.

Figure 5A:
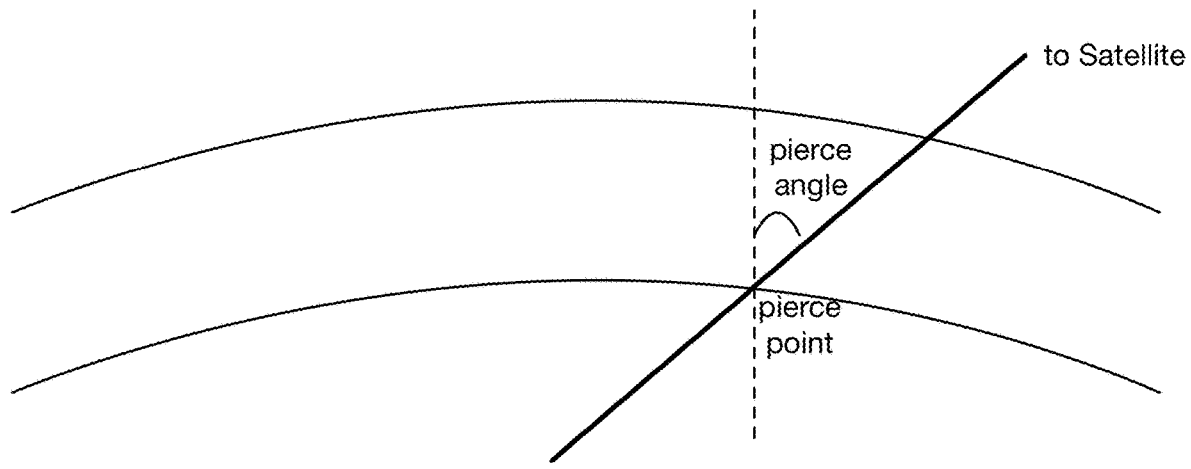
FIGS. 5A and 5B are schematic representations of examples of a single thin shell and multishell models for atmospheric effects, respectively.
Figure 5B:
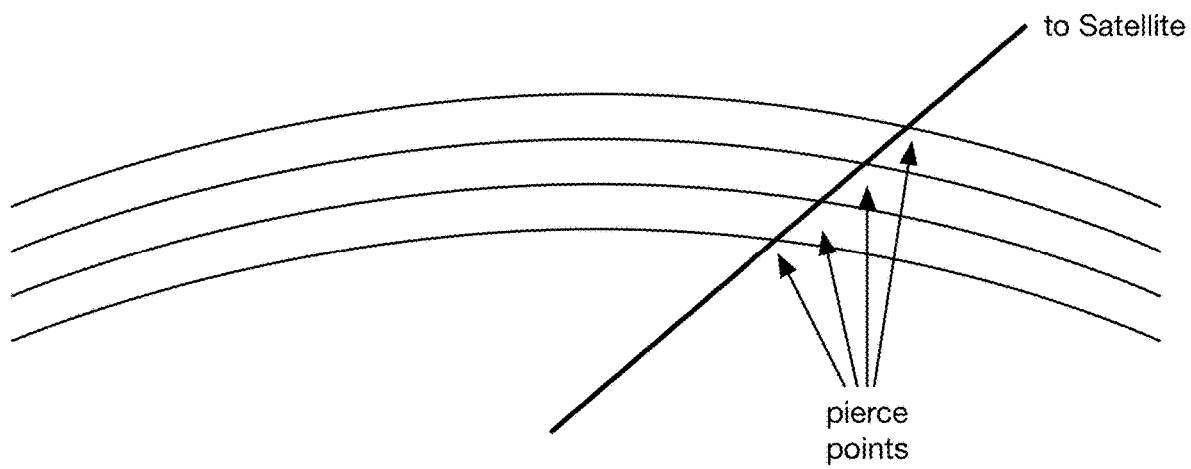

The GNSS corrections can be determined based on pierce points (as shown for example in FIG. 5A), pierce angles (as shown for example in FIG. 5A), models, machine learning (e.g., neural networks), and/or in any manner. In some variants, the atmosphere can be divided into one or more thin shells (e.g., 2 thin shells, 3 thin shells, 5 thin shells, as shown for example in FIG. 5B, etc.) where each shell can be modeled to determine corrections (dependent or independent of other shells).

In a first specific example, at least one of ionospheric or tropospheric effects can be modelled as a function of least one of a pierce point or a pierce angle for satellite rays for each satellite of the set of satellites (e.g., a line of sight vector between a receiver such as a mobile receiver, a reference station, etc. and each satellite). In a first variation of the first specific example, ionospheric effects for each of the set of satellites can be modelled as a function of pierce point and pierce angle for lines of sight between the mobile receiver and each of the set of satellites. In a second variation of the first specific example, tropospheric effects for each of the set of satellites can be modelled as a function of pierce point (e.g., where a static correction for pierce angle for lines of sight between the mobile receiver and each of the set of satellites can be used).

In a second specific example, at least one of ionospheric or tropospheric effects can be modelled using a Gaussian process (e.g., using undifferenced satellite observations, using single differenced satellite observations, using double differenced satellite observations, etc. such as where the Gaussian process does not include differencing satellite observations). In a variation of the second specific example, a covariance function relating a first pierce point associated with a first satellite observation and a second pierce point associated with a second satellite observation comprises a squared exponential function. However, any suitable covariance function can be used.

In a third specific example, the GNSS corrections can be determined (and/or validated) as disclosed in U.S. patent application Ser. No. 16/983,706 titled "SYSTEM AND METHOD FOR GAUSSIAN PROCESS ENHANCED GNSS CORRECTIONS GENERATION" filed 3 Aug. 2020, U.S. application Ser. No. 16/817,196 titled "SYSTEMS AND METHODS FOR REAL TIME KINEMATIC SATELLITE POSITIONING" filed 12 Mar. 2020, U.S. application Ser. No. 16/865,077 titled SYSTEMS AND METHODS FOR HIGH-INTEGRITY SATELLITE POSITIONING" filed 1 May 2020, and/or U.S. application Ser. No. 16/589,932 titled "SYSTEMS AND METHODS FOR DISTRIBUTED DENSE NETWORK PROCESSING OF SATELLITE POSITIONING DATA" filed 1 Oct. 2019, each of which is incorporated its entirety by this reference, or otherwise be determined or validated. The first, second, and third specific examples can be combined in any manner (e.g., pierce points and/or angles can be used as inputs to a Gaussian process) and/or used in isolation.

S200 can include validating the GNSS corrections. However, the GNSS corrections can be separately validated, not validated, and/or have any suitable validity. For example, the GNSS corrections can be validated by comparing corrections generated using a first set of satellite observations and a second set of satellite observations (e.g., where each set can be independently used to determine satellite corrections and those satellite corrections compared to validate the GNSS corrections). However, the GNSS corrections can be validated based on a model (e.g., the validity of the model), comparison to other data (e.g., comparison to weather data, based on a receiver position determined using the corrections, etc.), and/or otherwise be validated.

The GNSS corrections are preferably determined (e.g., independently determined for) for tiles (e.g., a plurality of spatial regions that cover a geographic region such as a city, county, parish, state, country, continent, ocean, sea, lake, etc.), but can be determined over a geographic region, at reference points, at reference lines, and/or be determined for any region. Determining the GNSS corrections for tiles can include fitting the modelled GNSS corrections to fitting functions, determining residuals for the fitting functions, determining model values at discrete locations (e.g., grid points), and/or any suitable steps. However, the set of GNSS corrections can be modelled within each tile and/or otherwise be generated. The set of GNSS corrections can be fit, for example, using non-linear curve fitting (e.g., nonlinear least squares, nonlinear absolute value, etc.), linear curve fitting, algebraic fitting, geometric fitting, and/or any suitable fitting methods.

Determining the receiver locality S300 functions to determine an approximate receiver location. The receiver locality is preferably within about 100 km (e.g., within or less than 0.1 km, 1 km, 10 km, 100 km, etc.) of the actual receiver position, but can be greater than 100 km from the actual receiver position. The receiver locality can be: coordinates, a tile identifier, a grid point identifier (and/or nearest grid point), or other identifier. The receiver locality can be determined by the receiver, a computing system (e.g., a local computing system, a remote computing system, etc.), and/or by any component. Determining the receiver locality can additionally or alternatively include determining the receiver kinematics (such as receiver velocity, receiver attitude, etc.) where the receiver kinematics can be used in addition to or alternatively to the receiver locality and/or any suitable steps.

The receiver locality can uniquely correspond to or be associated with a tile and/or can correspond to or be associated with a plurality of tiles. The receiver locality can be determined from (or based on) a nearest cellular tower, cellular tower trilateration, a WIFI signal, the last known receiver position, a satellite connection (e.g., satellite network), computer vision (e.g., to identify objects in the environment of the receiver), user input, reference station signal (e.g., a nearest reference station), a transponder signal, a previous receiver position (e.g., determined from a previous iteration of the method, receiver position calculated from the satellite observations without convergence, receiver position calculated from the satellite observations without validation, receiver position calculated from the satellite observations such as using pseudorange to calculate an approximate receiver location, receiver position determined prior to an outage, etc.), receiver position estimated based on or using inertial navigation (e.g., dead reckoning), receiver position estimated based on or using pilotage, receiver position estimated based on or using celestial navigation, receiver position estimated based on or using inertial navigation (e.g., dead reckoning), receiver position estimated based on or using radio navigation (e.g., LORAN-C, Omega, Tacan, US Army Position Location and Reporting System, etc.), and/or can be otherwise determined.

In a first variant, the receiver locality is transmitted to the computing system (e.g., the computing system hosting a corrections generator).

In a second variant, the receiver locality is used to determine one or more receiver tiles corresponding to the receiver locality. The receiver tiles can be transmitted to the computing system. The receiver tile preferably corresponds to a transmission region, but can correspond to a validity region, a tile, and/or any suitable tile. The receiver tiles can be determined using (e.g., based on) an overlap in the receiver locality and the tile region (e.g., when the overlap between the receiver locality and the tile region meets or exceeds a threshold), using an equation, using a look-up table, using machine learning, and/or can be otherwise determined. The receiver locality can correspond to a single tile (e.g., transmission region), to a plurality of tiles (e.g., 2 tiles, 3 tiles, 4 tiles, etc.), and/or to no tiles (e.g., in error states, when the receiver locality is outside of a coverage region, etc.). In a first specific example, the receiver tile(s) is determined only based on the receiver locality. In a second specific example, the receiver tile(s) can be determined based on the receiver locality and receiver kinematic data (e.g., speed, trajectory, velocity, acceleration, etc.).

However, the receiver tile can be determined in any manner.

Transmitting the GNSS corrections S400 functions to transmit the GNSS corrections to the receiver. Only the GNSS corrections corresponding to or associated with the receiver tile are preferably transmitted. However, additionally or alternatively, GNSS corrections corresponding to tiles adjacent to the receiver tile(s) can be transmitted (e.g., to act as a buffer such as in case connectivity between the receiver and computing system is lost or has a high transmission latency) and/or any corrections can be transmitted. The GNSS corrections are preferably transmitted from the computing system to the receiver, but can be transmitted between any two endpoints. All or a subset of GNSS corrections corresponding to each receiver tile can be transmitted.

The GNSS corrections can be transmitted automatically (e.g., on a schedule), semi-automatically (e.g., responsive to a trigger such as an update to a correction, an update to a correction within the receiver tile(s), a change in the receiver tile, etc.), in response to correction receipt request, manually (e.g., responsive to a user input). The GNSS corrections can be transmitted at predetermined times (e.g., every 1 s, 2 s, 5 s, 10 s, 20 s, 30 s, 45 s, 60 s, 2 min, 3 min, 5 min, 10 min, 20 min, 30 min, 45 min, 60 min, etc.), based on a receiver locality (e.g., when the receiver locality crosses a boundary between receiver tiles, when a receiver locality changes by at least a threshold distance, etc.), when the corrections are updated (e.g., when a new correction has been determined), when the set of satellites changes (e.g., when a new satellite comes into the line of view of the receiver, when a new satellite is in the line-of-view of the reference station, when a satellite leaves the line-of-view of the receiver, when a satellite leaves the line-of-view of the reference station, etc.), based on the receiver kinematics (e.g., a predicted time the receiver will cross into a different tile, to select which tiles to transmit, etc.), and/or with any timing and/or based on any information.

In variants, such as when the receiver tile corresponds to a plurality of tiles, each GNSS correction of the plurality of tiles, the GNSS corrections corresponding to the previous tile that the receiver was in, the GNSS corrections corresponding to a new tile that the receiver is in, the most recent (e.g., most recently updated) GNSS corrections, interpolated GNSS corrections (e.g., interpolated between all or a subset of the plurality of tiles), and/or any suitable GNSS corrections can be transmitted.

In some variants, transmitting the GNSS correction can include determining the receiver tile. Determining the receiver tile at the computing system can be performed in the same or a different manner as determining the receiver tile at the receiver (e.g., as described above).

Determining the receiver position S500 functions to determine the GNSS receiver position to high accuracy (e.g., receiver position is known to within 1 mm, 2 mm, 5 mm, 1 cm, 2 cm, 5 cm, 1 dm, 2 dm, 5 dm, 1 m, 2 m, 5 m, 10 m, etc.) and/or with high integrity (e.g., total integrity risk $\leq 1 \times 10^{-4}$/hr, $\leq 1 \times 10^{-5}$/hr, $\leq 1 \times 10^{-6}$/hr, $\leq 1 \times 10^{-7}$/hr, $\leq 1 \times 10^{-8}$/hr, etc.). The receiver position is preferably determined by the receiver (e.g., a computing system thereof, a positioning engine, etc.), but can be determined by the computing system and/or any component. Determining the receiver position can include: determining a carrier phase ambiguity (e.g., a float carrier phase ambiguity, an integer carrier phase ambiguity, etc.), calculating the receiver position based on the carrier phase ambiguity, determining a baseline vector between a receiver and a reference station, determining an absolute receiver position (e.g., by applying the baseline vector to the reference station location), and/or any steps. The receiver position can be determined using an estimator and/or any suitable method. Exemplary estimators include: Kalman filters (e.g., unscented Kalman filters, extended Kalman filters, recursive Kalman filters, etc.), particle filters, monte carlo simulations, a least squares solution (e.g., an iterative snapshot least squares method), a Gaussian process, and/or any suitable estimator can be used.

Determining the receiver position can include correcting the set of satellite observations (observed by the receiver) based on the GNSS corrections, which can function to decrease and/or remove the impact of errors on the satellite observations. Correcting the set of satellite observations can include subtracting the GNSS corrections and the satellite observations, adding the GNSS corrections to the satellite observations, transforming the satellite observations based on the GNSS corrections, inputting the GNSS corrections into the estimator (e.g., where a model of the Kalman filter can use the GNSS corrections to process and/or correct the satellite observations), and/or otherwise use the GNSS corrections to correct the set of satellite observations.

In variants, the receiver position and/or protection level can be transmitted to an external system, stored (e.g., cached), used to operate and/or control an external system, used to generate operation instructions for an external system (e.g., using a GNSS receiver computing system, an external system computing system, etc.), and/or used in any manner.

Figure 3:
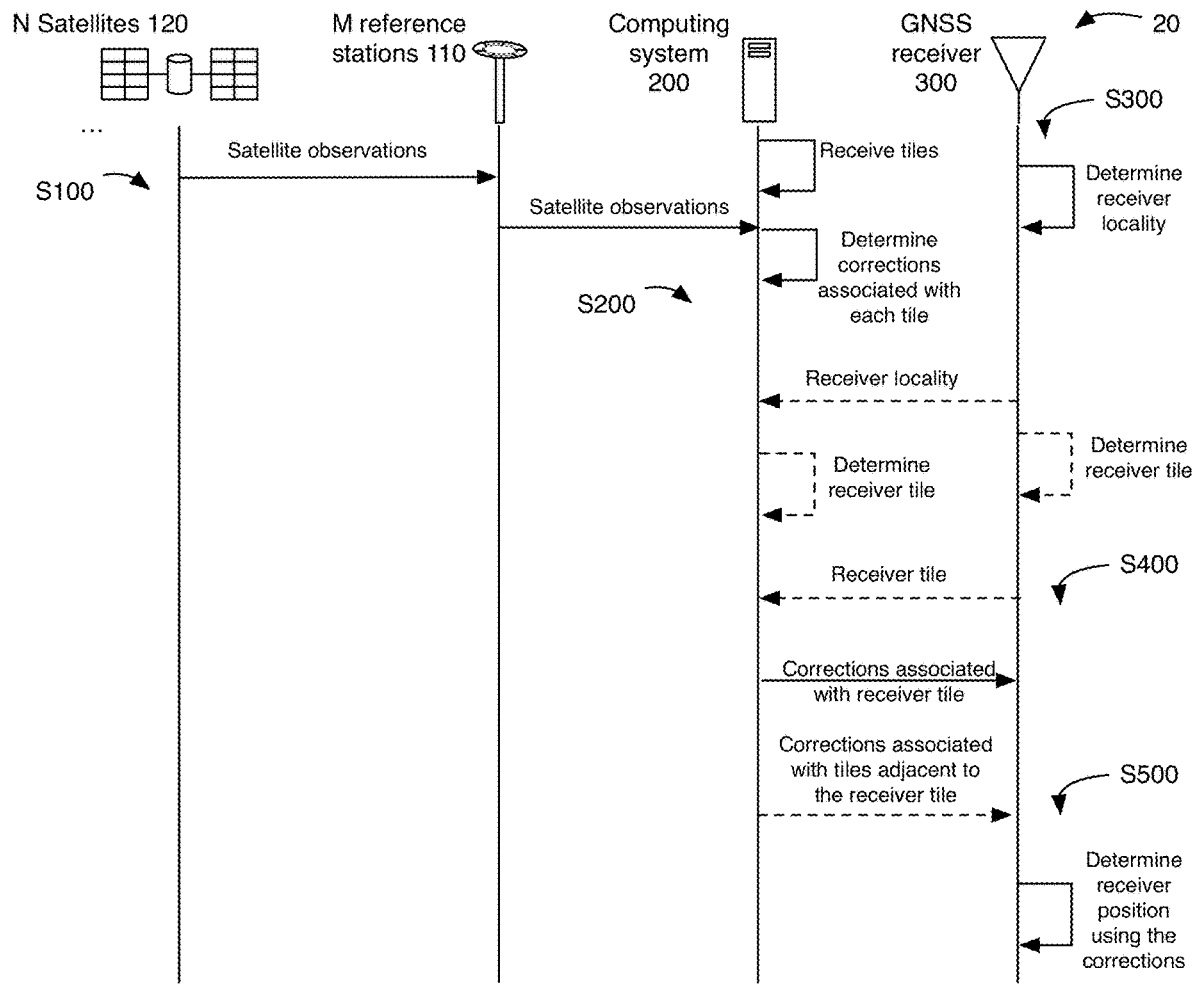
FIG. 3 is a flowchart representation of an example of the method.

In a specific example, as shown in FIG. 3, a method for using corrections to determine a receiver position can include: at one or more reference stations, receiving satellite observations corresponding to one or more satellites; transmitting the satellite observations to a computing system; at a receiver, determining a receiver locality; transmitting the receiver locality to the computing system; determining GNSS corrections where the GNSS corrections correspond to a plurality of tiles and where the corrections include global and local corrections; transmitting the GNSS corrections corresponding to tiles associated with the receiver locality to the receiver; and determining the receiver position using the GNSS corrections. In a related example, only GNSS corrections corresponding to a tile that the receiver is located in can be transmitted. However, GNSS corrections for tiles adjacent to the tile the receiver is in can be transmitted, and/or any GNSS corrections can be transmitted to the receiver.

Figure 6:
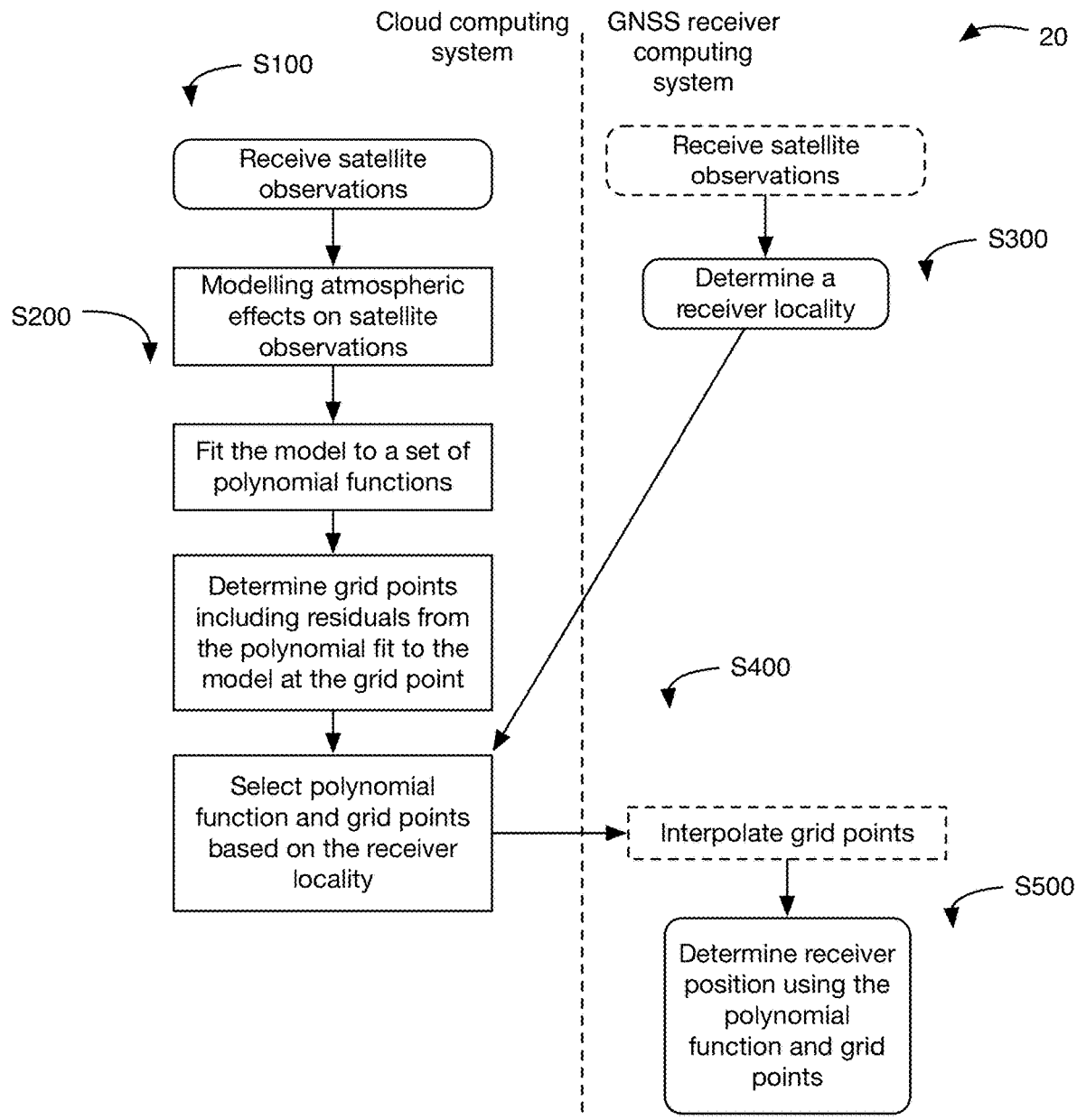
FIG. 6 is a flowchart representation of an example of the method.

In a second specific example, as shown in FIG. 6, a method for generating satellite corrections can include: receiving satellite observations associated with a set of satellites; modelling an atmospheric effect as a function of least one of a pierce point or a pierce angle for satellite rays for each satellite of the set of satellites; fitting the atmospheric effects to a plurality of polynomial functions; determining a set of grid points comprising residuals of the polynomial fit to the atmospheric effects model; determining a locality of the GNSS receiver; and determining the satellite corrections from: a polynomial function, of the plurality of polynomial functions, associated with a geographic region matching the locality of the GNSS receiver; and an interpolated residual determined from grid points proximal the locality of the GNSS receiver.

However, the system and/or method can otherwise be performed.

The methods of the preferred embodiment and variations thereof can be embodied and/or implemented at least in part as a machine configured to receive a computer-readable medium storing computer-readable instructions. The instructions are preferably executed by computer-executable components integrated with a system for GNSS PVT generation. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A system for generating satellite corrections comprising:
   a cloud computing server configured to:
      receive reference satellite observations associated with a set of satellites;
      model an atmospheric effects for each satellite of the set of satellites;
      fit the atmospheric effects to a polynomial function, wherein the polynomial function is valid within a geographic region, wherein the atmospheric effects are fit to a second polynomial function in a second geographic region;
      determine residuals of the polynomial fit to the atmospheric effects model at a series of discrete points;
      transmit the satellite corrections;
   wherein the satellite corrections comprise the polynomial function and a residual correction, wherein the satellite corrections are associated with a locality of a GNSS receiver.

2. The system of claim 1, wherein the atmospheric effects are modelled as a function of least one of a pierce point or a pierce angle for satellite rays for each satellite of the set of satellites.

3. The system of claim 1, wherein the geographic region and the second geographic region are overlapping.

4. The system of claim 3, wherein the geographic region and the second geographic region overlap by at least 1° latitude or 1° longitude.

5. The system of claim 1, wherein the geographic region comprises an approximately 5° latitude by 5° longitude geographic region.

6. The system of claim 1, wherein the cloud computing server transmits the satellite corrections to a corrections server, wherein the corrections server transmits the satellite corrections to the GNSS receiver based on the locality of the GNSS receiver.

7. The system of claim 1, wherein the residual correction comprises an interpolated residual determined from discrete points proximal the locality of the GNSS receiver.

8. The system of claim 7, wherein the interpolated residual comprises a residual interpolated between 2, 3, or 4 discrete points proximal the locality of the GNSS receiver.

9. The system of claim 1, wherein the discrete points are separated from neighboring discrete points by about 1° latitude or about 1° longitude.

10. A method for generating atmospheric corrections for GNSS positioning comprising:
    a) receiving satellite observations associated with a set of satellites;
    b) determining atmospheric corrections from the satellite observations using an atmospheric model, wherein the atmospheric corrections comprise residual corrections for residuals between the atmospheric model and the set of fitting functions;
    c) fitting the atmospheric corrections to a set of fitting functions, each fitting function valid for a unique geographical area, wherein neighboring geographical areas overlap; and
    d) transmitting the atmospheric corrections;
    wherein a fitting function of the set of fitting functions is selected for a GNSS receiver based on a locality of the GNSS receiver.

11. The method of claim 10, wherein the fitting function is selected when the locality of the GNSS receiver is within a transmission region of the unique geographical region associated with the fitting function, wherein the transmission region is smaller than the unique geographical area.

12. The method of claim 11, wherein the unique geographical area is an approximately 5° latitude by approximately 5° longitude geographic area.

13. The method of claim 11, wherein the transmission region of the unique geographical area is an approximately 3° latitude by approximately 3° longitude geographic area.

14. The method of claim 11, wherein the transmission region for the neighboring geographical areas do not overlap.

15. The method of claim 10, wherein the neighboring geographical areas overlap in an area that is at least 1° latitude by 1° longitude.

16. The method of claim 10, wherein the residual corrections are determined at a set of discrete points.

17. The method of claim 16, wherein a residual correction for the GNSS receiver is determined by interpolating between residual corrections at discrete points proximal the locality of the GNSS receiver.

18. The method of claim 10, wherein atmospheric model models the atmospheric effects as a function of least one of a pierce point or a pierce angle for satellite rays for each satellite of the set of satellites.

19. The method of claim 10, wherein each fitting function of the set of fitting functions is a polynomial of at most second order.

20. A method for generating atmospheric corrections for GNSS positioning comprising:
    a) receiving satellite observations associated with a set of satellites;
    b) determining atmospheric corrections from the satellite observations using an atmospheric model;
    c) fitting the atmospheric corrections to a set of fitting functions, each fitting function valid for a unique geographical area, wherein neighboring geographical areas overlap, wherein each fitting function of the set of fitting functions is a polynomial of at most second order; and d) transmitting the atmospheric corrections;

wherein a fitting function of the set of fitting functions is selected for a GNSS receiver based on a locality of the GNSS receiver.

21. The method of claim 20, wherein the fitting function is selected when the locality of the GNSS receiver is within a transmission region of the unique geographical region associated with the fitting function, wherein the transmission region is smaller than the unique geographical area.

22. The method of claim 21, wherein the unique geographical area is an approximately 5° latitude by approximately 5° longitude geographic area.

23. The method of claim 21, wherein the transmission region of the unique geographical area is an approximately 3° latitude by approximately 3° longitude geographic area.

24. The method of claim 21, wherein the transmission region for the neighboring geographical areas do not overlap.

25. The method of claim 20, wherein the neighboring geographical areas overlap in an area that is at least 1° latitude by 1° longitude.

* * * * *